(12) United States Patent
Ben Abdelaziz et al.

(10) Patent No.: US 12,257,927 B2
(45) Date of Patent: Mar. 25, 2025

(54) SYSTEM FOR OPTIMIZING THE POSITIONING OF A VEHICLE SEAT

(71) Applicant: Faurecia Sièges d'Automobile, Nanterre (FR)

(72) Inventors: Omar Ben Abdelaziz, Tille (FR); Samuel Baudu, Boulogne-Billancourt (FR); Maroua Benzarti, Savigny sur Orge (FR)

(73) Assignee: Faurecia Sièges d'Automobile, Nanterre (FR)

( * ) Notice: Subject to any disclaimer, the term of this patent is extended or adjusted under 35 U.S.C. 154(b) by 76 days.

(21) Appl. No.: 17/747,983

(22) Filed: May 18, 2022

(65) Prior Publication Data

US 2022/0371477 A1    Nov. 24, 2022

(30) Foreign Application Priority Data

May 20, 2021    (FR) ...................................... 21 05266

(51) Int. Cl.
*B60N 2/02*    (2006.01)
(52) U.S. Cl.
CPC ......... *B60N 2/0248* (2013.01); *B60N 2/0273* (2023.08); *B60N 2/0268* (2023.08)
(58) Field of Classification Search
None
See application file for complete search history.

(56) References Cited

U.S. PATENT DOCUMENTS

| 8,954,299 B2 * | 2/2015 | You ...................... A47C 31/126 703/2 |
| 11,110,832 B2 * | 9/2021 | Da Costa ............. A61B 5/6893 |
| 2012/0086249 A1 * | 4/2012 | Hotary ................... B60N 2/505 297/284.3 |

(Continued)

FOREIGN PATENT DOCUMENTS

| DE | 102004004710 A1 | 8/2005 | |
| DE | 102015113936 A1 * | 2/2016 | ........... G06F 16/337 |
| FR | 3081408 A1 * | 11/2019 | ........... B60N 2/0248 |

OTHER PUBLICATIONS

DE 102015113936 Translated into English (from German) via Google Patents (Year: 2016).*

(Continued)

*Primary Examiner* — Jason Holloway
(74) *Attorney, Agent, or Firm* — Reising Ethington P.C.

(57) ABSTRACT

A system for optimizing the positioning of a vehicle seat includes: a module for obtaining and saving at least one morphological parameter of a passenger on the seat; a seat positioning adjustment module having at least one sensor within the vehicle, controlling the positioning; and a module for determining the positioning adjustment to be applied as a function of the morphological parameter. The system is configured to: determine at least one adjustment change that optimises passenger comfort to be applied during vehicle operation, automatically alter the position of the seat to achieve the adjustment change, or signal the passenger of the adjustment change to be applied, via an interaction module, and guide the passenger to manually achieve the adjustment change, via a predetermined sound or light signal.

18 Claims, 4 Drawing Sheets

(56) References Cited

U.S. PATENT DOCUMENTS

| | | | | |
|---|---|---|---|---|
| 2015/0084985 A1* | 3/2015 | Baudu | ............... | B60N 2/0252 |
| | | | | 345/629 |
| 2016/0354027 A1* | 12/2016 | Benson | ............... | A61B 5/7282 |
| 2018/0199729 A1* | 7/2018 | Bullard | ............. | A61G 7/05707 |
| 2021/0362677 A1* | 11/2021 | Martini | ............. | H04L 63/0853 |
| 2022/0055510 A1* | 2/2022 | Mizoi | ................ | B60N 2/914 |
| 2022/0388527 A1* | 12/2022 | Barth | ................ | G06V 10/82 |

OTHER PUBLICATIONS

FR 3081408 Translated into English (from French) via Google Patents (Year: 2019).*
French Search Report corresponding to French Application No. FR 2105266, dated Feb. 3, 2022, 2 pages.

* cited by examiner

FIG. 4

SYSTEM FOR OPTIMIZING THE POSITIONING OF A VEHICLE SEAT

CROSS-REFERENCE TO RELATED APPLICATIONS

This application is a U.S. non-provisional application claiming the benefit of French Application No. 21 05266, filed on May 20, 2021, which is incorporated herein by reference in its entirety.

TECHNICAL FIELD

The present invention relates to a system for optimizing the positioning of a vehicle seat, comprising:
- a module for obtaining and saving at least one morphological parameter representative of a current passenger occupying the seat;
- a seat positioning adjustment module, the adjustment module comprising at least one sensor, located within the vehicle, and configured to monitor the positioning of the seat;
- a determination module configured to determine the seat positioning adjustment to be applied at least as a function of said at least one morphological parameter representative of the current passenger.

The invention further relates to a vehicle comprising such an optimisation system.

The invention further relates to a vehicle seat positioning optimisation method.

The present invention further relates to a computer program comprising software instructions which, when executed by a computer, implement such a vehicle seat positioning optimisation method.

BACKGROUND

A vehicle seat must be comfortable enough to accommodate passengers in the vehicle.

For this purpose, it is known to use at least one morphological parameter representative of a current passenger occupying the seat to implement a first automatic adjustment of the positioning of said seat.

However, such a first adjustment obtained automatically according to the current prior art does not always meet the passenger's individual need for comfort, especially when the passenger is experiencing specific local pain. In the presence of such pain, at present the passenger can only try to adjust the position of the seat by himself, which is not optimal and does not always achieve the desired pain relief. Moreover, such trial-end-error, from a safety point of view, when carried out by a driving passenger, usually requires the vehicle to be stopped so as not to disturb their concentration while driving the vehicle.

SUMMARY

One of the aims of the invention is to overcome these disadvantages by offering a system for optimising the positioning of a vehicle seat that is fast and simple for the passenger to implement, in order to effectively optimise their comfort and relieve or avoid local body pains.

To this end, the invention relates to a vehicle seat positioning optimisation system, comprising:
- a module for obtaining and saving at least one morphological parameter representative of a current passenger occupying the seat;
- a seat positioning adjustment module, the adjustment module comprising at least one sensor, located within the vehicle, and configured to monitor the positioning of the seat;
- a determination module configured to determine the seat positioning adjustment to be applied at least as a function of said at least one morphological parameter representative of the current passenger;
- the optimisation system being configured to:
  - determine, using the determination module of the optimisation system, at least one seat positioning adjustment change, optimising the comfort of the current passenger, to be applied while the vehicle is operating,
  - automatically modify, via the adjustment module, the positioning of the seat to achieve the adjustment change to be applied, or
  - signal to the current passenger the seat positioning adjustment change to be applied, via a module of the system interacting with the current passenger, and to guide the passenger through manually altering the seat positioning to achieve the adjustment change, via a predetermined sound or light signal representative of achieving the adjustment change.

Thus, the seat positioning optimisation system facilitates and accelerates the passenger's access to an optimal seat positioning that optimises their comfort, for example by locally minimising the pain of identified body areas. The positioning adjustment change optimising the comfort of the passenger is achieved either automatically, via the adjustment module, or manually but in a guided manner, which avoids any trial-and-error and, if necessary, avoids stopping the vehicle to achieve the change in the seat's positioning to relieve the passenger's discomfort while driving.

According to other optional features of the invention, taken alone or in any technically feasible combination:
- the positioning adjustment change is determined from the initial positioning adjustment of the seat prior to the vehicle starting, and/or from a positioning adjustment initially selected by the current passenger, via the interaction module, prior to the vehicle starting;
- the determination module is configured to determine the seat positioning adjustment change also as a function of the uninterrupted driving time of the vehicle by the current passenger;
- the determination module is configured to determine the seat positioning adjustment change to be applied, by machine learning, from at least one input element belonging to the group comprising at least one of the following:
  - said at least one morphological parameter representative of the current passenger;
  - the model of vehicle;
  - at least one piece of information representative of the vehicle occupancy rate;
- the machine learning uses a database previously constructed from at least one building block belonging to the group comprising at least:
  - a plurality of dummy morphologies,
  - a plurality of predetermined positioning adjustment rules,
  - a plurality of vehicle occupancy rates,
  - a plurality of vehicle types,
  - a plurality of distinct body areas.
- the interaction module is configured to display a plurality of distinct body areas to be relieved by the seat positioning adjustment change, each body area being selectable by the current passenger, and the determination module is configured to determine the seat positioning adjustment change to be applied also as a function of at least one body area to be relieved previously selected by the current passenger;

the determination module is further configured to:
associate a local comfort score with each pair formed by a selectable body area and a seat position, and associate an overall comfort score with each seat position, select the positioning associated with the maximum overall comfort score, and for each selectable body area, the positioning associated with a maximum local comfort score, and the interaction module is configured to display selectable information representative of each of the positions selected by the determination module.

According to another aspect, the invention further concerns a vehicle comprising a seat positioning optimisation system as described above.

The present invention also relates to a method for optimising the positioning of a vehicle seat, the method being suitable for implementation by the previously described seat positioning optimisation system, the determination module being configured to determine an optimal seat positioning adjustment to be applied at least as a function of at least one morphological parameter representative of the current passenger, the method comprising at least:

a step of machine learning using a database previously constructed from at least one building block belonging to the group comprising at least:
a plurality of dummy morphologies,
a plurality of predetermined positioning adjustment rules,
a plurality of vehicle occupancy rates,
a plurality of vehicle types,
a plurality of distinct body areas,
the first phase of machine learning providing a predictive model combining:
an overall comfort score for each first distinct set formed of at least:
a dummy morphology of said plurality,
a type of vehicle of said plurality,
a seat position,
and/or
a local comfort score for each second distinct set formed of:
a dummy morphology of said plurality,
a type of vehicle of said plurality,
a seat position,
a body area of said plurality, a step for optimising the positioning of a seat of a vehicle under consideration, configured to provide a current passenger, while said vehicle under consideration is operating, as a function of at least one morphological parameter representative of said current passenger, for each body area, the positioning associated with the maximum local comfort score and/or the positioning associated with the maximum overall comfort score, the optimisation step being configured to be repeated while said vehicle in question is in uninterrupted service, and/or in the event of a change in the passenger and/or occupancy rate of said vehicle, and/or in the event of a stop/start of said vehicle.

A further object of the invention is a computer program comprising software instructions which, when executed by a computer, implement such a seat positioning optimisation method.

BRIEF DESCRIPTION OF THE DRAWINGS

These features and advantages of the invention will appear more clearly upon reading the following description, given solely as a non-limiting example, and made in reference to the attached drawings, in which.

DETAILED DESCRIPTION

Figure 1:
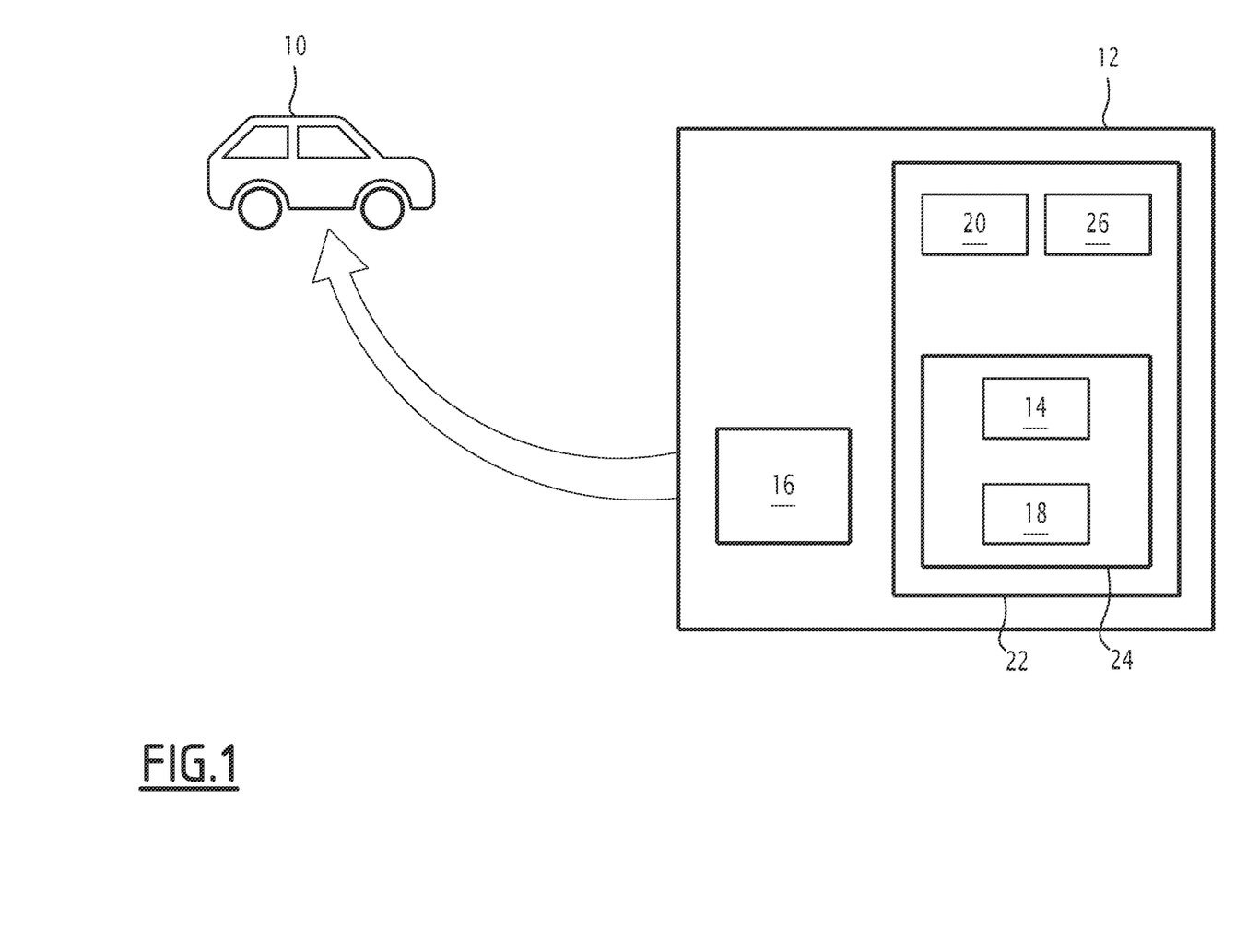
FIG. 1 is a schematic representation of vehicle seat positioning optimisation system according to one embodiment of the invention.

A transport vehicle 10, hereafter referred to simply as vehicle 10, is shown in FIG. 1.

The vehicle 10 is, for example, a motor vehicle, or alternatively, an aircraft, or any other type of vehicle carrying passengers, such as a car, bus, train, plane, or truck.

The vehicle 10 is able to move within an environment.

It should be noted that, in this description, the term "able to" means either "capable of", "suitable for", "adapted to" or "configured for".

The vehicle comprises within its passenger compartment at least one seat, not shown in FIG. 1, and a system 12 for optimising the positioning of said at least one seat of a vehicle 10, comprising:

a module 14 for obtaining and saving at least one morphological parameter representative of a current passenger occupying the seat;

a seat positioning adjustment module 16, the adjustment module comprising at least one sensor, located within the vehicle, and configured to monitor the positioning of the seat;

a determination module 18 configured to determine the seat positioning adjustment to be applied at least as a function of said at least one morphological parameter representative of the current passenger.

The optimisation system 12 is specifically configured to:
determine, using the determination module 18 of the optimisation system 12, at least one seat positioning adjustment change, optimising the comfort of the current passenger, to be applied while the vehicle 10 is operating, automatically modify, via the adjustment module 16, the positioning of the seat to achieve the adjustment change to be applied, or signal to the current passenger the seat positioning adjustment change to be applied, via a module 20 of the system 12 interacting with the current passenger, and to guide the passenger through manually altering the seat positioning to achieve the adjustment change, via a predetermined sound or light signal representative of achieving the adjustment change.

Such a seat corresponds to the seat of a driving passenger or the seat of an accompanying passenger.

In particular, the module 14 for obtaining and saving at least one morphological parameter is, according to a first variant, coupled to the interaction module 20 and capable of asking the passenger about their measurements by one or more requests via said interaction module 20.

According to a second variant, the module 14 for obtaining and saving at least one morphological parameter is connected to a set of sensors, comprising, for example, at least one image sensor or sensors located within the passenger compartment of the vehicle 10, and the module 14 for obtaining and saving is suitable to process the data supplied by the set of sensors, in particular through image processing in order to determine at least one morphological parameter of the current passenger, such as their height, weight, chest height, arm length, leg length, the distance between their elbow and wrist, the distance between their shoulder and elbow, the distance between their knee and ankle, etc.

According to a first variant, the seat positioning adjustment module 16 comprises one or more manual seat positioning adjustment means for modifying the positioning of the seat with respect to the longitudinal axis of the vehicle, modifying the seat height, the angle between the backrest and the seat cushion, etc.

Additionally or alternatively, the seat positioning adjustment module 16 comprises one or more motorised seat positioning adjustment means which can be controlled, in particular, by the determination module 18 in order to automatically modify the seat positioning to achieve the adjustment change to be applied which is suitable for increasing the individual comfort of the passenger.

The adjustment module 16 comprises at least one sensor, located within the vehicle, and configured to monitor the positioning of the seat at any given time.

The determination module 18 makes it possible, in particular when the current passenger in question is seated for the first time, to determine the initial positioning adjustment of the seat to be applied at least as a function of the at least one morphological parameter representative of the current passenger, and then, to determine a positioning adjustment change, individually optimising the comfort of the current passenger.

In particular, the determination module 18 is configured to determine the positioning adjustment change to be applied to optimise passenger comfort, from the initial positioning adjustment of the seat prior to the vehicle starting, and/or from a positioning adjustment initially selected by the current passenger, via the interaction module 20, prior to the vehicle starting.

As an optional supplement, the determination module 18 is configured to determine the positioning adjustment change to be applied to optimise the comfort of the passenger, as a function of the uninterrupted driving time of the vehicle by the current passenger. Such a consideration makes it possible, in particular, to take into account the fatigue associated with maintaining the same posture during said uninterrupted period.

As an optional supplement, the determination module 18 is configured to determine the seat positioning adjustment change to be applied, by machine learning, from at least one input element belonging to the group comprising at least:
said at least one morphological parameter representative of the current passenger;
the model of vehicle;
at least one piece of information representative of the vehicle occupancy rate.

Taking into account the occupancy rate of the vehicle allows the determination module 18 to determine a change of position adapted both to the desired comfort of the passenger occupying the seat in question and also adapted to the overall comfort of all the occupants of the vehicle, for example to optimise the comfort of both the driving passenger and the passenger seated behind the driving passenger.

Furthermore, as an optional supplement to this variant, the machine learning uses a database previously constructed from at least one building block belonging to the group comprising at least:
a plurality of dummy morphologies,
a plurality of predetermined positioning adjustment rules,
a plurality of vehicle occupancy rates,
a plurality of vehicle types,
a plurality of distinct body areas.

In particular, the predetermined positioning adjustment rules correspond to industrial rules of the trade resulting in particular from the expert know-how associated with the optimisation of seat positioning within a vehicle 10 optimising the comfort of its occupants.

According to one particular aspect, the database can be updated as and when required by the passenger(s) to improve the machine learning implemented in order to best prevent the ailments of the passenger(s) associated with their posture(s) within said vehicle 10.

According to a particular embodiment of the present invention, the interaction module 20 is configured to display a plurality of distinct body areas, i.e. N distinct body areas, with N being an integer, to be relieved via the seat positioning adjustment change to be determined by the determination module 18, each body area being selectable by the current passenger via the interaction module 20. According to this same particular embodiment, the determination module 18 is then further configured to determine the seat positioning adjustment change to be applied, also as a function of at least one body area to be relieved previously selected by the current passenger.

For example, the distinct body areas to be relieved and selected are the head and in particular neck pain or visual fatigue, the torso (i.e. the chest) and in particular the back, lumbar pain or sciatica, the arms which can be tired by continuously holding the steering wheel, the legs, etc.

Figure 2:
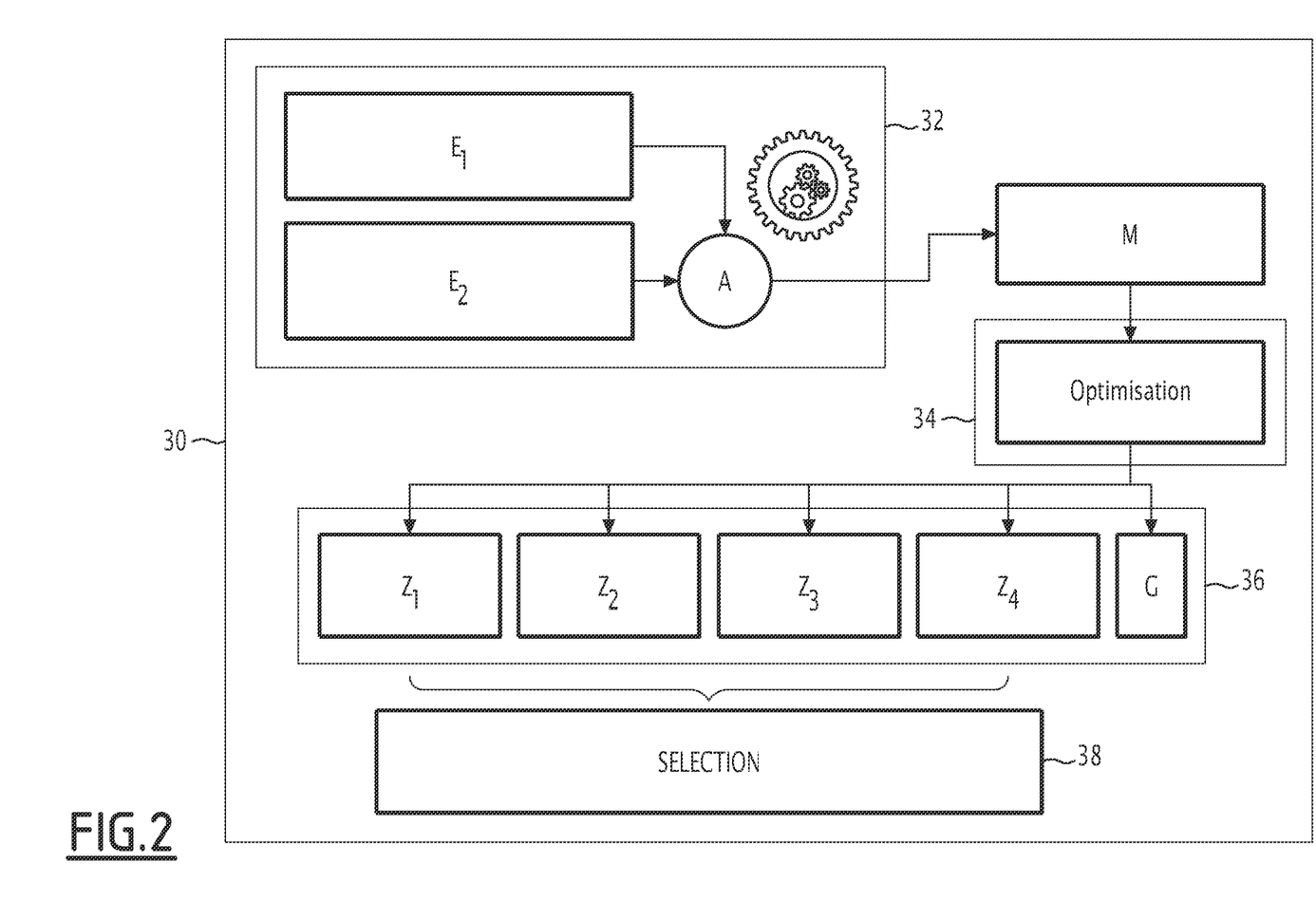
FIG. 2 is a flowchart of an example vehicle seat positioning optimisation method implemented by the vehicle seat positioning optimisation system of FIG. 1.

According to a particular aspect of this particular embodiment, the determination module 18 is further configured to:
associate a local comfort score with each pair formed by a selectable body area and a seat position, and associate an overall comfort score with each seat position,
select the positioning associated with the maximum overall comfort score, and for each selectable body area, the positioning associated with a maximum local comfort score,
the interaction module 20 being then configured to display selectable information representative of each of the positions selected by the determination module, as illustrated hereafter in relation to FIG. 2.

According to a particular aspect, such an audible or luminous signal is emitted by the interaction module 20 via one or more loudspeakers, not shown, placed within the passenger compartment of the vehicle 10, and via a luminous indicator such as a light-emitting diode (LED) dedicated to seat positioning adjustment placed in the vicinity of a means of manually adjusting the positioning of said seat and/or located on the dashboard of said vehicle.

In particular, the achievement of the adjustment change is configured to be signalled to the passenger by a change of colour of the light signal from red (representative of the fact that the positioning change to be applied has not been achieved) to green once it has been achieved).

In addition, the interaction module 20 is configured to display, via a screen on the dashboard, or broadcasting orally, via one or more loudspeakers, guidance instructions to guide and assist the passenger in achieving the positioning change to be applied to optimise their comfort.

In the example shown in FIG. 1, the system 12 for optimising the positioning of said at least one seat of a vehicle 10 comprises an information processing unit 22 formed for example by a memory 24 associated with a processor 26.

In the example of FIG. 1, the obtaining module 14 and the determination module 18, are each in the form of software, or a software brick, which can be executed by the processor 26. The memory 24 is then able to store an obtaining software configured to obtain, in particular by generating and transmitting request(s) via the interaction module 20, at least one morphological parameter representative of the current passenger occupying the seat. The memory 24 is also configured to store determination software configured for a seat positioning adjustment change, optimising the comfort of the current passenger, to be applied while the vehicle is operating. The processor 26 of the information processing unit 22 is then able to execute the obtaining software, the determination software.

In a variant not shown, the obtaining module 14 and the determination module 18 are each in the form of a programmable logical component, such as a FPGA (Field Programmable Gate Array), or as a dedicated integrated circuit, such as an ASIC (Application-Specific Integrated Circuit).

When the system 12 for optimising the positioning of said at least one seat of a vehicle 10 is in the form of software, that is to say in the form of a computer program, it is also capable of being stored on a computer-readable medium, not shown. The computer-readable medium is, for example, a medium that can store electronic instructions and be coupled with a bus from a computer system. For example, the readable medium is an optical disk, magneto-optical disk, ROM memory, RAM memory, any type of non-volatile memory (for example EPROM, EEPROM, FLASH, NVRAM), magnetic card or optical card. The readable medium in such a case stores a computer program comprising software instructions.

The operation of the vehicle 10 seat positioning optimisation system 12 will now be explained with the aid of FIG. 2, showing a flowchart of an example vehicle seat positioning optimisation method 30 implemented by the vehicle seat positioning optimisation system 12 previously described in relation to FIG. 1.

In an initial step 32, the vehicle seat positioning optimisation system 12, via its determination module 18, implements a machine learning step A using a database previously constructed from at least one building block belonging to the group comprising at least:
- a plurality $E_1$ of dummy morphologies,
- a plurality $E_2$ of predetermined positioning adjustment rules,
- a plurality, not shown, of vehicle occupancy rates,
- a plurality, not shown, of vehicle types,
- a plurality, not shown, of distinct body areas, the first phase of machine learning A providing a predictive model M combining:
an overall comfort score for each first distinct set formed of at least:
- a dummy morphology of said plurality,
- a type of vehicle of said plurality,
- a seat position,
and/or
a local comfort score for each second distinct set formed of:
- a dummy morphology of said plurality,
- a type of vehicle of said plurality,
- a seat position,
- a body area of said plurality, In other words, through machine learning, the vehicle seat positioning optimisation system 12 learns for each set of input parameter(s) the seat positioning that maximises, in terms of score, the comfort of a local body area, or the whole body overall.

For example, in order to determine the local comfort score associated with the passenger's torso as a function of the positioning of the seat, the determination module 18 determines, for each positioning, and each dummy morphology of said plurality, the angle A1 between the torso and the vertical with respect to the floor of the vehicle and the angle A2 between the thigh and the torso of the dummy morphology considered.

The local comfort score associated with the torso $S_{Torse}$ is then obtained as follows:

$$S_{Torse} = \frac{f(A1) * w_{A_1} + k(A2) * w_{A_2}}{w_{A_1} + w_{A_2}}$$

with $f$, respectively $k$, a function for comparing the value, in particular in degrees, of A1, respectively A2, with predetermined minimum and maximum limits, which can be configured and entered at the input of the system 12 for optimising the positioning of a seat, and $W_{A_1}$ and $W_{A_2}$ predetermined weightings which can be configured and entered at the input of the system 12 for optimising the positioning of a seat, such as, for example, $W_{A_1}=1$ and $W_{A_2}=2$.

For example, for the angle A2 between the thigh and the torso $A2_{min}90$, $A2_{max}=120$, and if A2=105 (i.e. the value in the centre of the interval [90; 120]) then k(A2=105)=1, considering that g applies a probability density of a normal distribution (i.e. Gaussian distribution), i.e. it is the position of the value in this range of values in the predetermined minimum and maximum bounds that influences the score. The same principle is applied to the angle A1 between the torso and the vertical to the vehicle floor.

The overall comfort score $S_G$ is a weighted average of the local comfort scores obtained. For example, if one considers seven distinct body areas whose local comfort score was obtained similarly to the local comfort score associated with the torso $S_{To}$ as described above, such as: the shins, associated with the local comfort score $S_{Tib}$, the feet, associated with the local comfort score $S_P$, the thighs associated with the local comfort score $S_C$, the thigh support associated with the local comfort score $S_{A-C}$, the head associated with the local comfort score $S_{Te}$, the torso associated with the local comfort score $S_{To}$, the arms associated with the local comfort score $S_B$, the overall comfort score $S_G$ is obtained according to the following formula:

$$S_G = \frac{(S_{To} * w_{To}) + (S_{Tib} * w_{Tib}) + (S_P * w_P) + (S_C * w_C) + (S_{A-C} * w_{A-C}) + (S_{Te} * w_{Te}) + (S_B * w_B)}{w_{To} + w_{Tib} + w_P + w_C + w_{A-C} + w_{Te} + w_B}$$

where $W_{To}$, $W_{Tib}$, $W_P$, $W_C$, $W_{A-C}$, $W_{Te}$, $W_B$ are predetermined weights, which can be configured and entered at the input of the system 12 for optimising the positioning of a seat.

Once the model M has been obtained at the end of the machine learning step 32, the method 30 comprises, a step 34 during which the determination module 18 optimises the positioning of the seat in order to provide a current passenger, while said vehicle under consideration is operating, as a function of at least one morphological parameter representative of said current passenger for each body area, the positioning associated with the maximum local comfort score and/or the positioning associated with the maximum overall comfort score, the optimisation step 34 being repeatable during uninterrupted operation of said vehicle under consideration, and/or in the event of a change in the passenger and/or in the occupancy rate of said vehicle, and/or in the event of stopping/restarting said vehicle.

In other words, in this step 34, the determination module 18 determines the positioning adjustment change to be applied to meet the comfort needs of the current passenger.

Next, in a step 36, the interaction module 20 of the vehicle seat positioning optimisation system 12 displays a plurality of distinct body areas to be relieved via the seat positioning adjustment change, each body area being selectable by the current passenger, for example by tactile pressure or by means of a slider.

In the example shown in FIG. 2, five areas $Z_1$, $Z_2$, $Z_3$, $Z_4$ and G of the screen are displayed for selection by the current user. Zone $Z_1$ corresponds in particular to the proposal for a seat position that optimises (i.e. maximises) head comfort, zone $Z_2$ to the proposal for a seat position that optimises torso comfort, zone $Z_3$ to the proposal for a seat position that optimises leg comfort, zone $Z_4$ to the proposal for a seat position that optimises arm comfort, and zone G to the proposal for a seat position that optimises overall passenger comfort.

In a step 38, the seat positioning optimisation system 12 detects the area of the display of the interaction module 20 selected by the passenger, selects the seat positioning adjustment change associated with that passenger selection, and automatically modifies, via the adjustment module 16, the seat positioning to achieve the adjustment change to be applied or signals to the current passenger this seat positioning adjustment change to be applied, via the current passenger interaction module 20, and guides the current passenger to manually modify the seat positioning to achieve the desired adjustment change, via a predetermined sound or light signal representative of achieving the adjustment change.

In other words, according to the example in FIG. 2, the seat positioning optimisation system 12 is configured to simultaneously offer five distinct seat positioning adjustment changes depending on the desired local or overall comfort.

Figure 3:
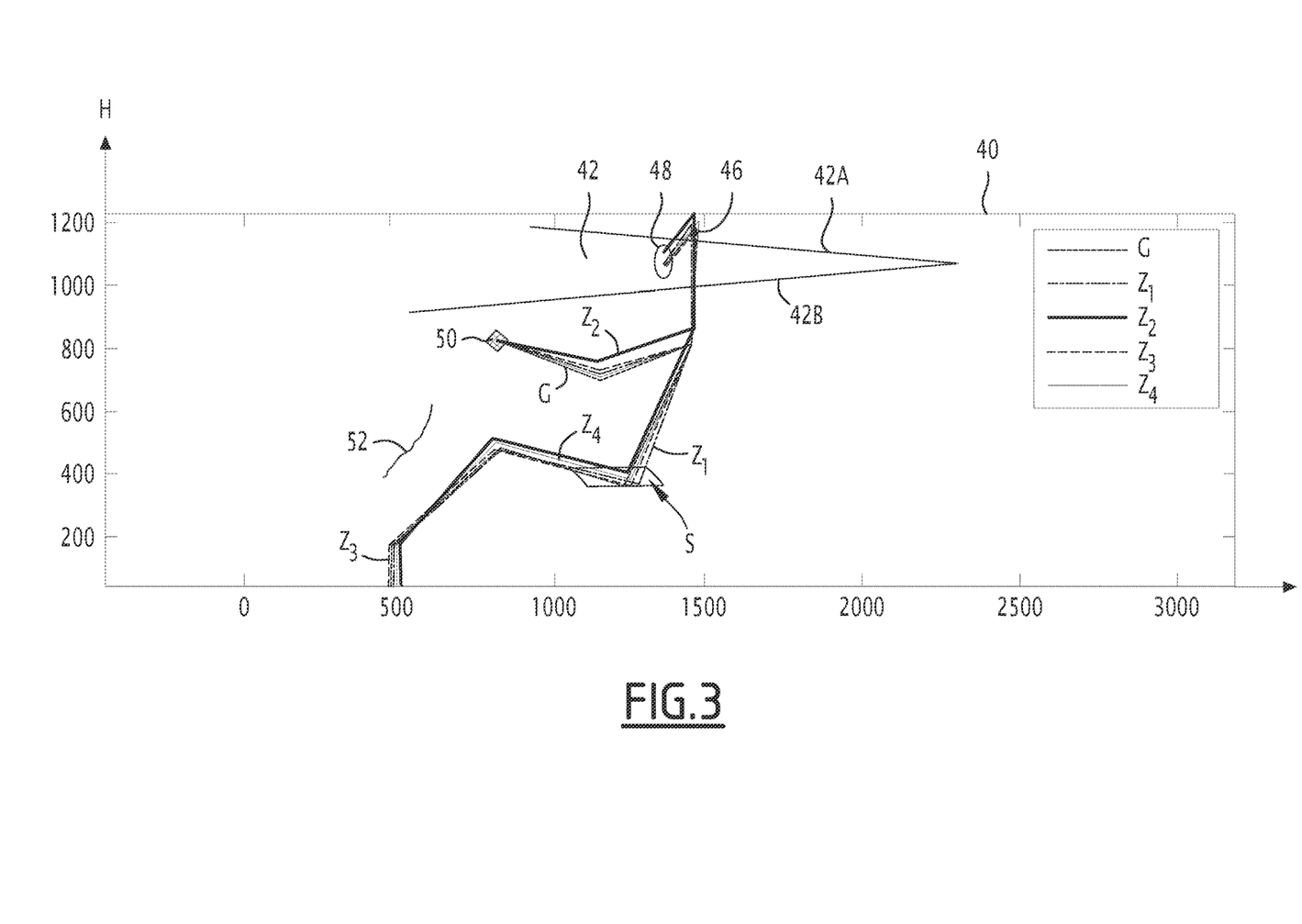
FIG. 3 is a schematic representation of positions of a single dummy optimising overall comfort or the comfort of specific body areas.

FIG. 3 is a schematic representation 40 of the positions of the same dummy optimising the overall comfort or the comfort of specific body areas, with the height H in mm from the floor of the vehicle 10 on the Y-axis, and the distance P in mm from the front end of the passenger compartment at point 0 mm on the X-axis, along the longitudinal axis of the vehicle 10, on the X-axis.

In FIG. 3, an area 42 defined by two lines 42A and 42B specific to each type of vehicle 10 is also shown. This zone 42 defines an additional constraint that is optionally taken into account in determining the seat positioning adjustment change S associated with a maximum local comfort score or a maximum overall comfort score that must otherwise ensure that each passenger 46, represented here by a male dummy with a height of 1m83 (1830 mm), has his eye 48 within the zone 42.

Optionally, the determination of the seat positioning adjustment change S also takes into account the location of the steering wheel 50 specific to each type of vehicle 10, as well as the distance of the passenger represented here by a dummy to the dashboard trim 52 of the passenger compartment.

As illustrated in FIG. 3, depending on the body area whose comfort is to be optimised, different passenger postures are to be preferred.

In particular, FIG. 3 shows the postures that optimise the comfort of the zone $Z_1$ corresponding to the head, the zone $Z_2$ corresponding to the torso, the zone $Z_3$ corresponding to the legs, the zone $Z_4$ corresponding to the arms, and the zone G optimising the overall comfort of the passenger.

Thus, as each passenger user has specific needs during the journey, as illustrated in FIG. 3, different postural positions adapted to the particular need of the passenger user are proposed. If the passenger user has problems within a specific part of the body, the system is configured to provide a position that maximises the comfort score related to that specific part of the body.

It is to be noted that each proposed change of seat positioning adjustment S is based on the particular morphology of the passenger obtained by the aforementioned obtaining module 14, this morphology being an input of the optimisation system, as well as the type of vehicle, and the occupancy rate.

Figure 4:
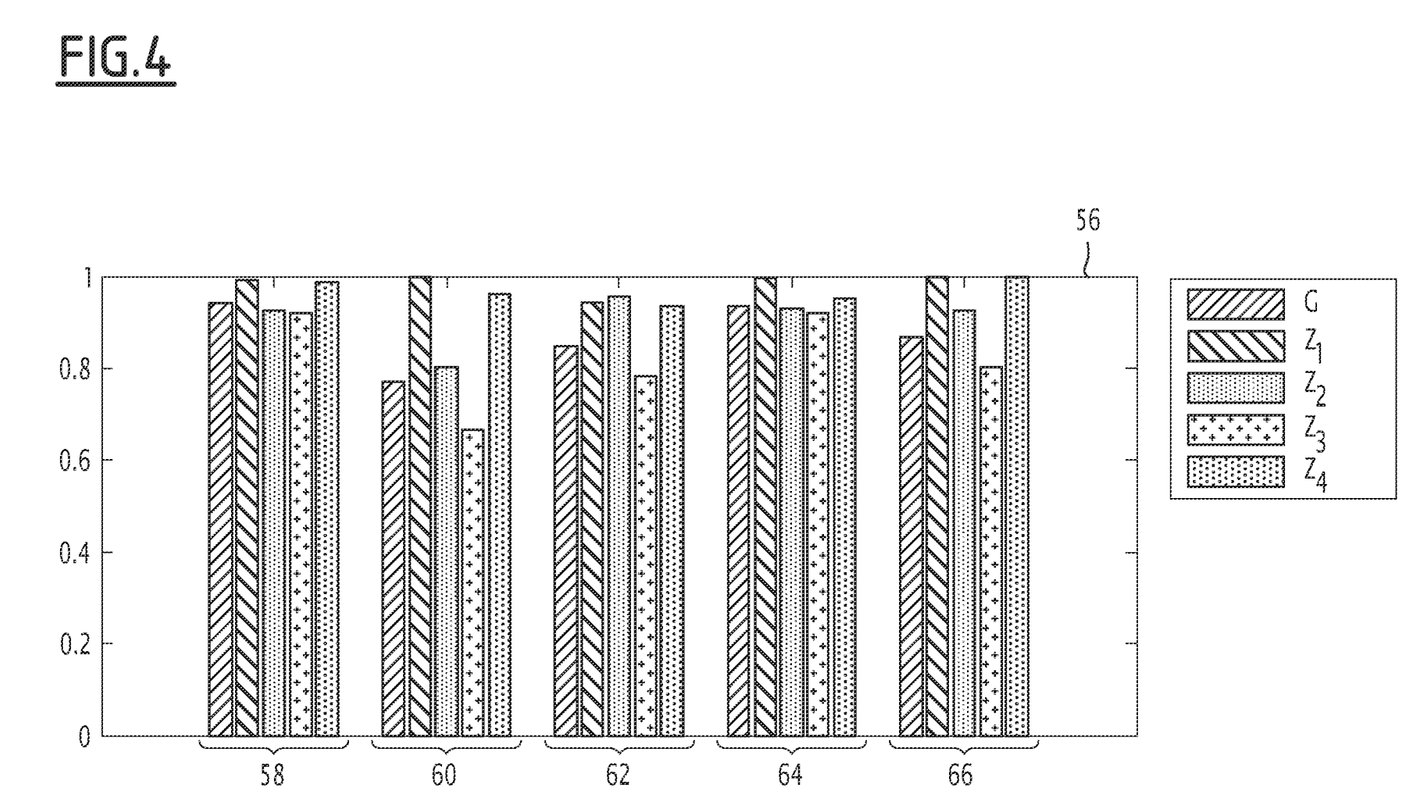
FIG. 4 is a histogram representation of an overall comfort score and of local comfort scores respectively associated with distinct body areas, for each positioning maximising one of these scores.

FIG. 4 is a representation in the form of a set 56 of histograms of an overall comfort score and local comfort scores respectively associated with distinct body areas, for each positioning maximising one of these scores, the value of each score being between 0 and 1.

According to a particular aspect of the present invention, the determination module 18 is configured to determine, at each iteration, N+1 scores, comprising N local scores associated with each body area for which comfort optimisation is sought, and an overall score, each iteration being instantiated upon request of the passenger, and/or periodically according to a predetermined period from the start of the vehicle 10, for example every hour.

In FIG. 4, the histogram 58 corresponds to the five scores obtained for a first seat positioning that maximises the overall score of the zone G optimising the overall comfort of the passenger, these five scores including the overall score of the zone G and four local scores of: the zone $Z_1$ corresponding to the head, the zone $Z_2$ corresponding to the torso, the zone $Z_3$ corresponding to the legs, the zone $Z_4$ corresponding to the arms.

Histogram 60 corresponds to the five scores obtained for a second seat positioning that maximises the local score of the body area $Z_1$ corresponding to the head in relation to the four other scores comprising the overall score of the zone G optimising the passenger's overall comfort and the three local scores of the zone $Z_2$ corresponding to the torso, the zone $Z_3$ corresponding to the legs, the zone $Z_4$ corresponding to the arms.

Histogram 62 corresponds to the five scores obtained for a third seat positioning that maximises the local score of the body area $Z_2$ corresponding to the torso in relation to the four other scores comprising the overall score of the zone G optimising the passenger's overall comfort and the three local scores of the zone $Z_1$ corresponding to the head, the zone $Z_3$ corresponding to the legs, the zone $Z_4$ corresponding to the arms.

Histogram 64 corresponds to the five scores obtained for a fourth seat positioning that maximises the local score of the body area $Z_3$ corresponding to the legs in relation to the four other scores comprising the overall score of the zone G optimising the passenger's overall comfort and the three local scores of the zone $Z_1$ corresponding to the head, the zone $Z_2$ corresponding to the legs, the zone $Z_4$ corresponding to the arms.

Histogram 66 corresponds to the five scores obtained for a fifth seat positioning that maximises the local score of the body area $Z_4$ corresponding to the arms in relation to the four other scores comprising the overall score of the zone G optimising the passenger's overall comfort and the three local scores of the zone $Z_1$ corresponding to the head, the zone $Z_2$ corresponding to the torso, the zone $Z_3$ corresponding to the legs.

The skilled person will understand that the invention is not limited to the embodiments described, nor to the specific examples of the description, the embodiments and variants mentioned above being capable of being combined with each other to generate new embodiments of the invention.

The present invention thus makes it possible to improve the seating comfort of each passenger in a personalised manner, as it is configured to meet each individual, localised or overall comfort need and/or to relieve specific body areas in a personalised manner.

In other words, the present invention allows for relaxation to be focused locally on specific body parts, such as arms, back, vision, torso, legs, etc.

In addition, by means of the implemented machine learning, it is possible to avoid (i.e. prevent), for a passenger user having problems with a specific part of the body and likely to experience chronic pain during long-distance journeys, the pain before it occurs, and avoid the associated muscle tension.

This helps avoid the health risks associated with sitting in the same position for an extended period of time.

The invention claimed is:

1. A system for optimizing positioning of a seat of a vehicle, comprising:
   a module for obtaining and saving at least one morphological parameter representative of a current passenger occupying the seat;
   a seat positioning adjustment module, the seat positioning adjustment module comprising at least one sensor, located within the vehicle, and configured to monitor the positioning of the seat;
   a determination module configured to determine a seat positioning adjustment to be applied at least as a function of said at least one morphological parameter representative of the current passenger; and
   an interaction module configured to display a plurality of distinct body areas to be relieved by at least one seat positioning adjustment change, each body area being selectable by the current passenger;
   wherein the system is configured to:
      determine, using the determination module of the system, the at least one seat positioning adjustment change, optimizing the comfort of the current passenger, to be applied while the vehicle is operating, wherein the at least one seat positioning adjustment change to be applied is also a function of at least one body area to be relieved previously selected by the current passenger,
      associate a local comfort score with each pair formed by a selectable body area and a seat position, and associate an overall comfort score with each seat position,
      select positioning associated with a maximum overall comfort score, and for each selectable body area, positioning associated with a maximum local comfort score,
      display, using the interaction module, selectable information representative of each of the positions selected by the determination module, and
      automatically modify, via the seat positioning adjustment module, the positioning of the seat to achieve the adjustment change to be applied.

2. The system according to claim 1, wherein the at least one seat positioning adjustment change is determined from an initial positioning adjustment of the seat prior to the vehicle starting.

3. The system according to claim 1, wherein the determination module is configured to determine the at least one seat positioning adjustment change also as a function of uninterrupted driving time of the vehicle by the current passenger.

4. The system according to claim 1, wherein the determination module is configured to determine the at least one seat positioning adjustment change to be applied, by machine learning, from at least one input element being said at least one morphological parameter representative of the current passenger.

5. The system according to claim 4, wherein the machine learning uses a database previously constructed from at least one building block being a plurality of dummy morphologies.

6. The system of claim 1, wherein the vehicle comprises the system for optimizing positioning of the seat according to claim 1.

7. A method for optimizing positioning, the method being implemented by the system according to claim 1, the determination module being configured to determine an optimal seat positioning adjustment to be applied at least as a function of at least one morphological parameter representative of the current passenger, the method comprising at least:
   a step of machine learning using a database previously constructed from at least one building block belonging to a group comprising at least:
      a plurality of dummy morphologies,
      a plurality of predetermined positioning adjustment rules,
      a plurality of vehicle occupancy rates,
      a plurality of vehicle types,
      a plurality of distinct body areas,
   the first phase of machine learning providing a predictive model including:
      an overall comfort score for each first distinct set formed of at least:
      a dummy morphology of said plurality,
      a type of vehicle of said plurality,
      a seat position,
   a step for optimizing the positioning of the seat of the vehicle under consideration, configured to provide the current passenger, while said vehicle under consideration is operating, as a function of at least one morphological parameter representative of said current passenger, for each body area, positioning associated with the maximum overall comfort score, the optimizing step being configured to be repeated with a change in the current passenger.

8. A non-transitory computer-readable medium including a computer program comprising software instructions which, when executed by a computer, at least partially implement the method for optimizing positioning of the seat according to claim 7.

9. The system according to claim 2, wherein the positioning adjustment change is determined from the initial positioning adjustment of the seat prior to the vehicle starting and from a positioning adjustment initially selected by the current passenger, via the interaction module, prior to the vehicle starting.

10. The system according to claim 1, wherein the determination module is configured to determine the seat positioning adjustment change to be applied, by machine learning, from at least one input element belonging to a group comprising at least,
said at least one morphological parameter representative of the current passenger; and
the model of the vehicle.

11. The system according to claim 1, wherein the determination module is configured to determine the seat positioning adjustment change to be applied, by machine learning, from at least one input element belonging to a group comprising at least,
said at least one morphological parameter representative of the current passenger; and
at least one piece of information representative of the vehicle occupancy rate.

12. The system according to claim 1, wherein the determination module is configured to determine the seat positioning adjustment change to be applied, by machine learning, from at least one input element belonging to a group comprising at least,
said at least one morphological parameter representative of the current passenger;
a model of the vehicle; and
at least one piece of information representative of an occupancy rate of the vehicle.

13. The system according to claim 4, wherein the machine learning uses a database previously constructed from at least one building block belonging to a group comprising at least:
a plurality of dummy morphologies,
a plurality of predetermined positioning adjustment rules,
a plurality of vehicle occupancy rates,
a plurality of vehicle types, and
a plurality of distinct body areas.

14. A method for optimizing positioning, the method being implemented by the system according to claim 1, the determination module being configured to determine an optimal seat positioning adjustment to be applied at least as a function of at least one morphological parameter representative of the current passenger, the method comprising at least:
a step of machine learning using a database previously constructed from at least one building block belonging to a group comprising at least:
a plurality of dummy morphologies,
a plurality of predetermined positioning adjustment rules,
a plurality of vehicle occupancy rates,
a plurality of vehicle types,
a plurality of distinct body areas,
the first phase of machine learning providing a predictive model combining:
an overall comfort score for each first distinct set formed of at least:
a dummy morphology of said plurality,
a type of vehicle of said plurality,
a seat position,
and
a local comfort score for each second distinct set formed of:
a dummy morphology of said plurality,
a type of vehicle of said plurality,
a seat position,
a body area of said plurality,
a step for optimizing the positioning of the seat of the vehicle under consideration, configured to provide the current passenger, while said vehicle under consideration is operating, as a function of at least one morphological parameter representative of said current passenger, for each body area, positioning associated with the maximum local comfort score and/or positioning associated with the maximum overall comfort score,
the optimizing step being configured to be repeated while said vehicle under consideration is in uninterrupted service, and/or with a change in the current passenger and/or occupancy rate of said vehicle, and/or with a stop/start of said vehicle.

15. A method for optimising optimizing positioning, the method being implemented by the system according to claim 1, the determination module being configured to determine an optimal seat positioning adjustment to be applied at least as a function of at least one morphological parameter representative of the current passenger, the method comprising at least:
a step of machine learning using a database previously constructed from at least one building block belonging to a group comprising at least:
a plurality of dummy morphologies,
a plurality of predetermined positioning adjustment rules,
a plurality of vehicle occupancy rates,
a plurality of vehicle types,
a plurality of distinct body areas,
the first phase of machine learning providing a predictive model combining:
an overall comfort score for each first distinct set formed of at least:
a dummy morphology of said plurality,
a type of vehicle of said plurality,
a seat position,
and/or
a local comfort score for each second distinct set formed of:
a dummy morphology of said plurality,
a type of vehicle of said plurality,
a seat position,
a body area of said plurality,
a step for optimizing the positioning of the seat of the vehicle under consideration, configured to provide the current passenger, while said vehicle under consideration is operating, as a function of at least one morphological parameter representative of said current passenger, for each body area, positioning associated with the maximum local comfort score and positioning associated with the maximum overall comfort score,
the optimizing step being configured to be repeated while said vehicle under consideration is in uninterrupted service, and/or with a change in the current passenger and/or occupancy rate of said vehicle, and/or with a stop/start of said vehicle.

16. A method for optimizing positioning, the method being implemented by the system according to claim 1, the determination module being configured to determine an optimal seat positioning adjustment to be applied at least as a function of at least one morphological parameter representative of the current passenger, the method comprising at least:
 a step of machine learning using a database previously constructed from at least one building block belonging to a group comprising at least:
  a plurality of dummy morphologies,
  a plurality of predetermined positioning adjustment rules,
  a plurality of vehicle occupancy rates,
  a plurality of vehicle types,
  a plurality of distinct body areas,
 the first phase of machine learning providing a predictive model combining:
  an overall comfort score for each first distinct set formed of at least:
   a dummy morphology of said plurality,
   a type of vehicle of said plurality,
   a seat position,
  and/or
   a local comfort score for each second distinct set formed of:
   a dummy morphology of said plurality,
   a type of vehicle of said plurality,
   a seat position,
   a body area of said plurality,
 a step for optimizing the positioning of the seat of the vehicle under consideration, configured to provide the current passenger, while said vehicle under consideration is operating, as a function of at least one morphological parameter representative of said current passenger, for each body area, positioning associated with the maximum local comfort score and/or positioning associated with the maximum overall comfort score, the optimizing step being configured to be repeated while said vehicle under consideration is in uninterrupted service and with a change in the current passenger.

17. A method for optimizing positioning, the method being implemented by the system according to claim 1, the determination module being configured to determine an optimal seat positioning adjustment to be applied at least as a function of at least one morphological parameter representative of the current passenger, the method comprising at least:
 a step of machine learning using a database previously constructed from at least one building block belonging to a group comprising at least:
  a plurality of dummy morphologies,
  a plurality of predetermined positioning adjustment rules,
  a plurality of vehicle occupancy rates,
  a plurality of vehicle types,
  a plurality of distinct body areas,
 the first phase of machine learning providing a predictive model combining:
  an overall comfort score for each first distinct set formed of at least:
   a dummy morphology of said plurality,
   a type of vehicle of said plurality,
   a seat position,
  and/or
   a local comfort score for each second distinct set formed of:
   a dummy morphology of said plurality,
   a type of vehicle of said plurality,
   a seat position,
   a body area of said plurality,
 a step for optimizing the positioning of the seat of the vehicle under consideration, configured to provide the current passenger, while said vehicle under consideration is operating, as a function of at least one morphological parameter representative of said current passenger, for each body area, positioning associated with the maximum local comfort score and/or positioning associated with the maximum overall comfort score,
 the optimizing step being configured to be repeated with a change in the passenger of said vehicle and with a change in occupancy rate of said vehicle.

18. A method for optimizing positioning, the method being implemented by the system according to claim 1, the determination module being configured to determine an optimal seat positioning adjustment to be applied at least as a function of at least one morphological parameter representative of the current passenger, the method comprising at least:
 a step of machine learning using a database previously constructed from at least one building block belonging to a group comprising at least:
  a plurality of dummy morphologies,
  a plurality of predetermined positioning adjustment rules,
  a plurality of vehicle occupancy rates,
  a plurality of vehicle types,
  a plurality of distinct body areas,
 the first phase of machine learning providing a predictive model combining:
  an overall comfort score for each first distinct set formed of at least:
   a dummy morphology of said plurality,
   a type of vehicle of said plurality,
   a seat position,
  and/or
   a local comfort score for each second distinct set formed of:
   a dummy morphology of said plurality,
   a type of vehicle of said plurality,
   a seat position,
   a body area of said plurality,
 a step for optimizing the positioning of the seat of the vehicle under consideration, configured to provide the current passenger, while said vehicle under consideration is operating, as a function of at least one morphological parameter representative of said current passenger, for each body area, positioning associated with the maximum local comfort score and/or positioning associated with the maximum overall comfort score,
 the optimizing step being configured to be repeated with a change in the passenger and occupancy rate of said vehicle and with a stop/start of said vehicle.

\* \* \* \* \*